United States Patent [19]

Wagner et al.

[11] 4,329,592
[45] May 11, 1982

[54] STEAM TURBINE CONTROL

[75] Inventors: James B. Wagner, Malden; David M. Priluck, Marblehead, both of Mass.

[73] Assignee: General Electric Company, Lynn, Mass.

[21] Appl. No.: 187,153

[22] Filed: Sep. 15, 1980

[51] Int. Cl.³ ............................................. F01K 13/02
[52] U.S. Cl. .................................... 290/40 R; 60/660
[58] Field of Search .................. 290/4 R, 40 C, 40 R; 60/660, 661, 662, 368, 392, 494

[56] References Cited

U.S. PATENT DOCUMENTS 3,879,616  4/1975  Baker et al. ...................... 290/40 R
4,201,924  5/1980  Uram ..................................... 60/660

FOREIGN PATENT DOCUMENTS

2707974  8/1978  Fed. Rep. of Germany ........ 60/660

Primary Examiner—J. V. Truhe
Assistant Examiner—Shelley Wade
Attorney, Agent, or Firm—James W. Mitchell

[57] ABSTRACT

In a power plant which includes a steam turbine with main control valves for admitting steam into the steam turbine and a steam bypass with bypass control valves for diverting steam around the steam turbine directly into a condenser, it is necessary to coordinate the operation of the respective valves so that the steam turbine can be started, brought up to speed, synchronized with a generator and then loaded as smoothly and efficiently as possible. The present invention provides for such operation and, in addition, allows for the transfer of power plant operation from the so-called turbine following mode to the boiler following mode through the use of the sliding pressure concept. The invention described is particularly applicable to combined cycle power plants.

20 Claims, 4 Drawing Figures

STEAM TURBINE CONTROL

BACKGROUND OF THE INVENTION

This invention is directed in general to steam turbine controls for power plants which include a steam turbine bypass capability and sliding pressure operation; and, in particular, this invention provides for the improved operation and efficiency of a combined cycle power plant.

In 1975, U.S. Pat. No. 3,879,616 issued to Baker, Dimitroff, Mizen and Gray, assigned to the assignee of the present invention, described the operation of a combined cycle power plant. In particular, the patent describes the operation of the steam turbine under load and pressure control whereby at a particular constant pressure, the turbine main control valve position is adjusted to accept increased steam flow while maintaining the constant steam pressure. As the valve attains 95% open, a higher pressure setpoint is introduced causing the valves to reposition to a new, less open position, about 70% open, whereupon the pressure is held constant while the valves are reopened to a accommodate new flow. This cyclic action is repeated several times until full load, flow and pressure are attained at valves wide open. Conversely, the steam turbine is unloaded by holding pressure constant as flow is diminished until a valve trigger point is reached, at which point a lower pressure level is attained by reopening the valve.

The present invention improves upon the foregoing patented invention by allowing the pressure to rise as flow becomes available and, hence, by putting the turbine in a boiler following mode. The pressure rise is not stepped or jogged as in the prior art patent but rather accomplished by raising the main control valve to a "normal set" or almost wide open condition at some predetermined flow-pressure, and then as flow continues to increase, adjusting the header pressure setpoint in accordance with the actual header pressure. This is accomplished through a unique feed-forward loop, through a split range signal controller and low valve gate, valve position sensing and feedback to the pressure setpoint circuit. The advantages obtained are more efficient operation, because of less valve throttling, more efficient design through the elimination of parallel independent control loops and more reliable operation because of less valve cyclic operation. Further, the invention provides for a smooth transition between bypass pressure control to main control valve pressure control.

Accordingly, one object of the present invention is to provide an improved boiler following, sliding pressure turbine control system.

Another object of the invention is to provide an improved turbine control system which will obviate ramping valves open and closed to obtaining varying pressure levels.

Still another object of the present invention is to provide a turbine control system which provides interdependent control loops.

Other objects, advantages and features of the present invention will become apparent from the following description of a preferred embodiment thereof when read in connection with the accompanying drawings.

BRIEF DESCRIPTION OF THE INVENTION

The present invention is applicable to a power plant of the type having at least one steam bypass system in combination with the main control valve for controlling steam admission through the steam turbine. Under initial operating conditions, available steam from the steam generator is diverted to a steam condenser as soon as a pressure floor is reached in the steam header. Steam pressure is initially held at the floor pressure level by the opening of the steam bypass valve to control pressure as flow increases. The next event is the buildup of sufficient steam to start or roll the steam turbine referred to as roll flow. At this point, the steam turbine main control valves open to control turbine speed to synchronization. This may be done under an autostart program or automatic turbine control which considers temperature restraints in admitting steam to the steam turbine. As the turbine main control valve opens under more or less constant steam flow from the steam generator, the header pressure begins to drop so that the bypass valve closes to maintain header pressure at the floor level. Under these conditions, the steam generator is in a turbine following mode and under speed-load control since it is the opening of the main control valve which controls the steam turbine given an adequate quantity of steam and it is the turbine restraints which control the steam demand. The bypass valve merely follows the pressure in the steam header. While still at floor pressure, the turbine may be synchronized to a generator and initially loaded. However, as soon as the bypass valve goes fully closed the steam turbine control transfers from speed/load control to pressure control. This is accomplished through a unique split range control device, a low value gate, valve position set circuit and valve position feedback loop to the pressure setpoint circuit. The speed/load control signal is ramped to a maximum value and the turbine control assumes pressure control in a boiler following mode. As flow increases to take on more load, the header pressure will rise, calling for a more open valve position which will introduce a feedback valve position error into the pressure setpoint circuit causing the pressure setpoint to rise to match the actual pressure in the header. A similar mode of operation is practiced for a low pressure steam admission circuit.

The novel features believed characteristic of the present invention are set forth in the appended claims. The invention itself, however, together with further objects and advantages thereof, may best be understood with reference to the following description taken in connection with the appended drawings.

DETAILED DESCRIPTION OF THE INVENTION

Figure 1:
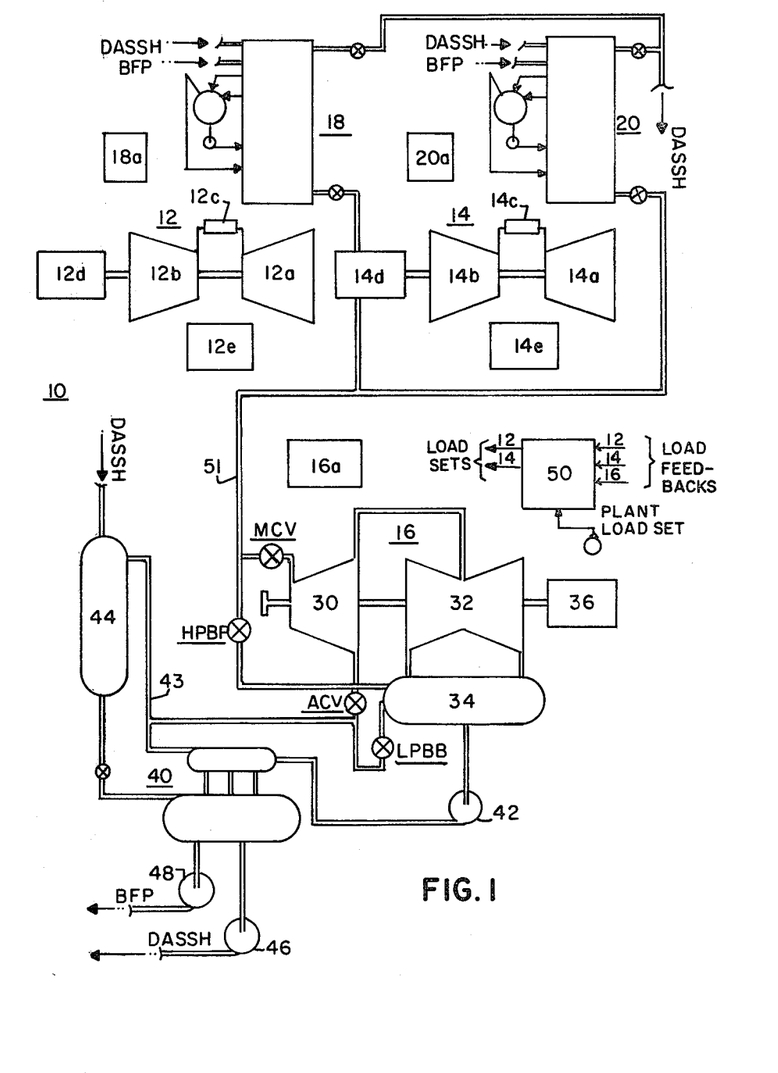
FIG. 1 is a block diagram of a combined cycle power plant.

FIG. 1 is a schematic drawing of a combined cycle power plant 10 which provides one environment in which the present invention may be practiced. Two gas turbine power plants 12 and 14 are thermally connected to a steam turbine power plant 16 through heat recovery steam generators (HRSG's) 18 and 20 respectively. Gas turbine power plant 12 comprises a gas turbine 12a driving a compressor 12b, which provides air to a combustion chamber 12c. The gas turbine also drives an electrical generator 12d. Gas turbine power plant 14 comprises a gas turbine 14a driving a compressor 14b, which provides air to a combustion chamber 14c. The gas turbine likewise drives an electrical generator 14d. Each gas turbine power plant also includes its own accessories such as a starter motor and turning gear (not shown) with each individual gas turbine power plant under the control of a gas turbine-generator (GT-GEN) control indicated by boxes 12e and 14e espectively. These controls may be the type furnished by the General Electric Company, Gas Turbine Division, Schenectady, New York, and shown in U.S. Pat. No. 3,879,616 issued Apr. 22, 1975. These controls are furnished under the registered General Electric Company trademark Speedtronic ®.

The steam turbine power plant 16 includes a high pressure turbine 30 and a double flow low pressure turbine 32, the latter giving up its remaining exhaust heat into a condenser 34. The high pressure turbine and the low pressure turbine are connected to drive an electrical generator or load 36. The turbines or turbine sections are driven by steam, the flow of which is basically controlled by four valve stations, including a main control valve MCV, high pressure bypass valve HPBP, admission control valve ACV, and a low pressure bypass valve LPBP. A steam turbine control 16a provides valve position demand setpoints to each of the aforementioned valves in a manner yet to be described as part of the present invention. The steam turbine power plant includes further accessories such as a turning gear, bearing oil supply and steam seal system which are well known in the art but which have been omitted so as not to obscure the present invention.

Two feedwater heating loops DASSH and BFP are present to provide steam in the following manner well known in the art. The DASSH loop or Deaerating Steam Supply Heater is a preheating feedwater loop which circulates water from a deaerator heater 40 to each of the HRSG's 18, 20 where it is heated and then flashed to steam in a flash tank 44 whereupon it is returned to deaerator heater 40 in line 43. Pump 46 pumps water from the deaerator storage tank into each of the HRSG's. Feedwater is heated into steam in the conventional manner in the BFP (boiler feedpump circuit). Boiler feedpump 48 pumps water into each of the HRSG's where it travels downwardly through the boiler in a heat exchange relationship with rising gas turbine exhaust gases to produce superheated steam for the steam turbine through a steam header 51.

In U.S. Pat. No. 3,879,616, issued Apr. 22, 1975 to Baker et al and assigned to the assignee of the present invention, the function of a combined plant control system is described in general detail. In the present description of the invention, a combined plant control system is represented by box 50. Load sets and feedbacks are designated by arrows with their respective origins or destinations noted on the arrows. Each HRSG 18, 20 is under the management of an HRSG control 18a and 20a respectively. In addition to internal HRSG considerations of level, temperature, pressure, etc., each HRSG control may be linked to a plant control 50 to determine in an automated fashion the sequencing of the various HRSG's. Alternatively, this operation may be carried out by an operator in the manual mode from a control room.

Figure 2:
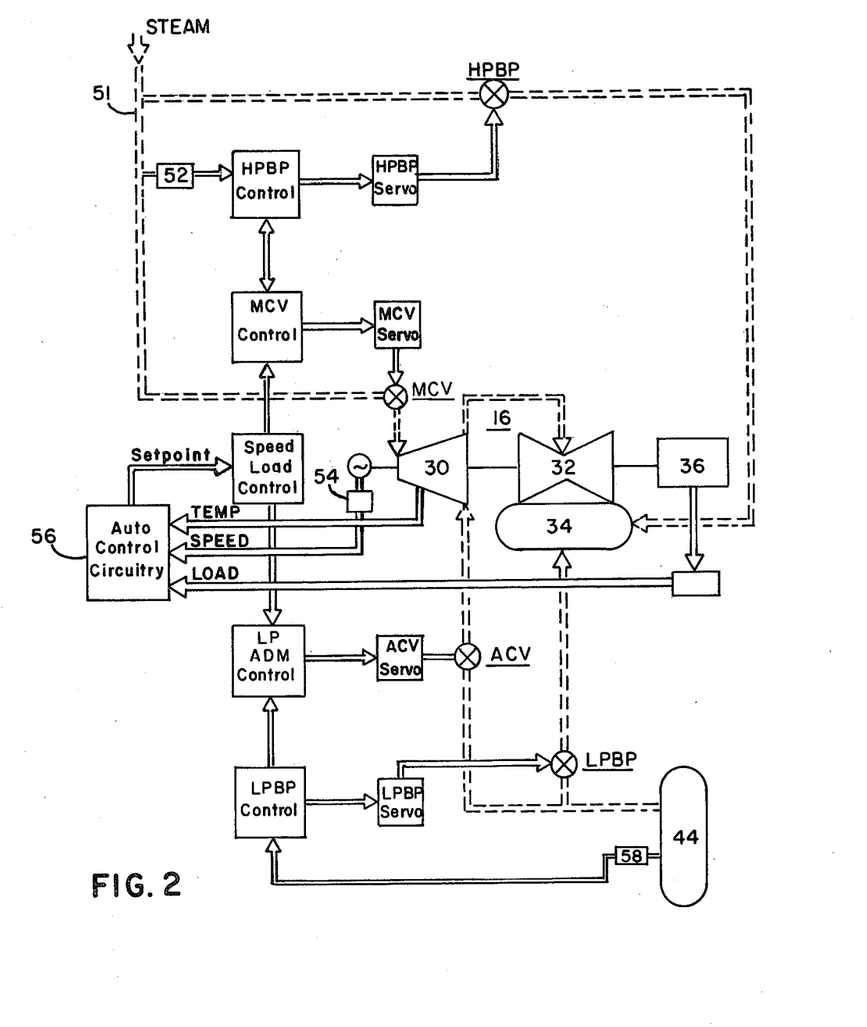
FIG. 2 is a block diagram of a steam turbine-generator power plant showing major control junctions.

FIG. 2 is a flow diagram of the various actuators and control loops according to the present invention which comprise the steam turbine control 16a. As will be seen, the present invention may be utilized in any type of sliding pressure steam turbine and is not necessarily limited to a combined cycle power plant. Like parts similar to FIG. 1 parts will be given the same numbers and the steam flow path is outlined in dotted lines whereas electrical signal paths are in solid, with arrows indicating the directions of steam flow or signal flow respectively.

High pressure steam from the heat recovery steam generators is conducted through a high pressure steam header 51 into the steam turbine high pressure section 30 through the main control valve MCV or bypasses the steam turbine and gets dumped into the turbine condenser 34 through the high pressure bypass valve HPBP. The apportionment of steam header flow is determined by the opening of the respective valves. In a startup mode, both the main control valve and the high pressure bypass valve are initialized in the closed position. Pressure transducer 52 senses header steam pressure. As steam header pressure begins to build beyond a value which exceeds the floor pressure setpoint determined in the HPBP control, the high pressure bypass valve opens to maintain header pressure at the floor set point. Thereafter, the flow continues to increase at floor pressure until "roll flow" is achieved, still at floor pressure. A desirable floor pressure in a combined cycle power plant is on the order of 400 psig.

At "roll flow" the main control valve is opened to energize the turbine, and speed control of the turbine is implemented. Setpoints or targets for the speed control are calculated in the Auto Control Circuitry 56 based on Temperature considerations in the high pressure casing. These considerations are set forth in U.S. Pat. No. 4,046,002 and U.S. Pat. No. 3,446,224. Knowning the allowable stress and turbine temperature, it is possible to calculate an allowable speed target. The actual speed may be taken from a speed transducer 54 which is then compared with the speed setpoint from Auto Control Circuitry 56 to generate a main control valve position demand setpoint. Assuming a constant steam flow, as the main control valve opens to pick up speed, the header pressure begins to fall, causing the high pressure bypass valve to close in order to maintain floor pressure. At or about 3600 rpm, the turbine is synchronized with the generator and load control begins.

While the foregoing operation is under way, the flash tank 44 will also begin producing steam whose pressure is sensed by pressure transmitter 58 connected at the output of the flash tank 44. The sensed pressure level is compared with a floor pressure setpoint with the LPBP control and the low pressure bypass valve LPBP begins to open where the available pressure tries to exceed the pressure floor. Thereafter, the auto control circuitry 56 provides a load demand signal to the low pressure admission control which provides setpoint control for opening the admission control valve ACV while causing the low pressure bypass valve LPBP valve to close. Normally, the admission control valve will be programmed to open after the high pressure bypass valve is closed and hence the main control valve is opened to prevent back flow of low pressure steam into the high pressure turbine.

Figure 3:
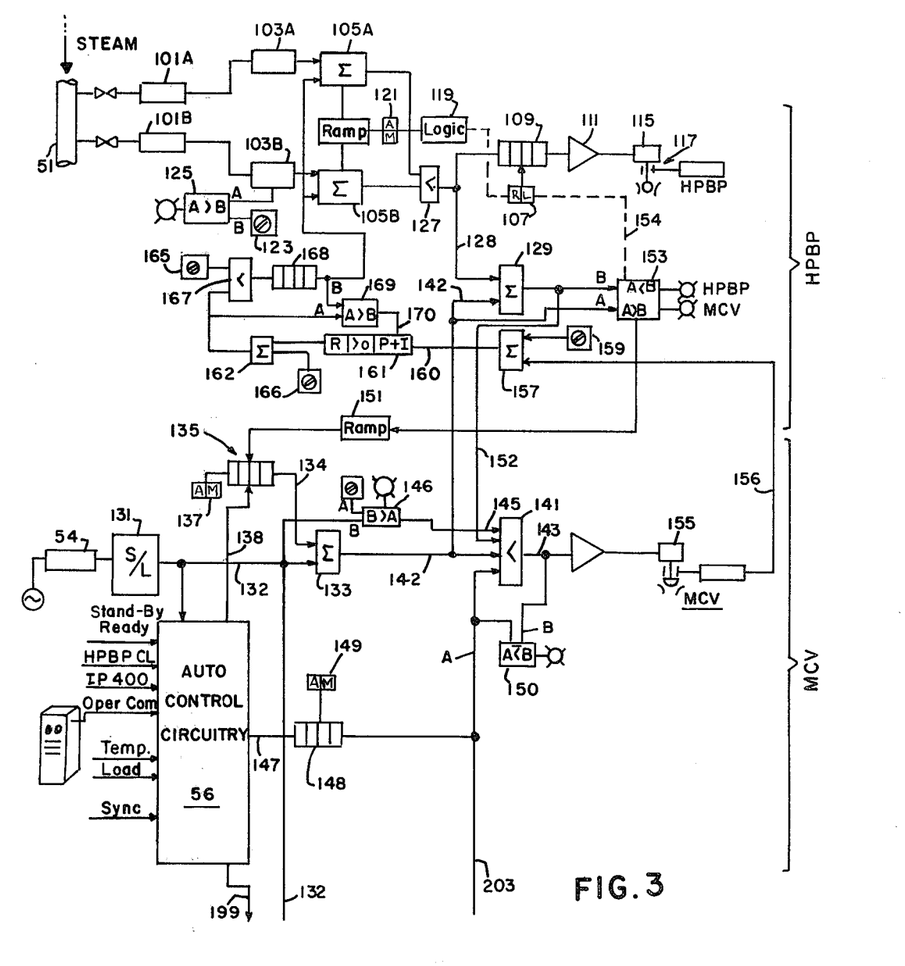
FIG. 3 is a schematic diagram of a steam turbine control system in accordance with the present invention.

FIG. 3 is a detailed functional block diagram of the turbine control system according to the present invention. Two redundant pressure transducers 101A and 101B provide input signals proportional to pressure into respective summing amplifiers 105A and 105B. The input signals are passed through signal buffer circuits 103A and 103B which provide signal conditioning and offset well known in the art. The high pressure bypass valve positioning circuit may be operated in a manual mode or in an automatic mode characterized as inlet pressure control (IPC). In the manual mode, raise or lower push buttons 107 may position the high pressure bypass valve (HPBP) 17 through a signal path comprising register 109, amplifier 111, and valve actuator or servo 115 controlling the HPBP valve 117. A logic circuit 119 disables the push button or manual control 107 if the operator selects automatic or inlet pressure control through push buttons 121 which select the mode of operation and cause the amplifiers 105A and 105B to ramp out of service, should the manual mode of operation be selected.

In the automatic IPC mode of operation a floor pressure is selected in a floor signal input circuit 166 to become the reference pressure setpoint and signal input into amplifiers 105A and 105B respectively. A comparator circuit 125 (A>B) provides an indication whenever the actual pressure exceeds the floor pressure also set in circuit 123. Both amplifiers provide a pressure error signal output to low value gate 127 with an electronic offset applied to one so that amplifier 105A is preferred unless there if a failure. The low value select signal output of low value gate 127 becomes a valve positioning signal 128 to the HPBP valve 117 in the IPC or automatic mode of operation. This same value indicative of desired HPBP valve position is input into a summing junction 129. A 0 to +10 volt input into summing junction 129 indicates HPBP proportional valve position from full close to full open. The circuitry as described is but a portion of the HPBP control circuitry indicated schematically in FIG. 2, the remainder to be further described in combination with the speed-load circuitry.

A turbine speed signal is picked up by speed transducer 54. In reality, there are multiple speed pick-ups (not shown) which are subject to voting logic or 2 out of 3 failure logic contained in speed/load circuitry 131. The output of the speed/load circuitry 132, is input into a summing junction 133. A second input 134 into summing junction 133 is the speed/load demand signal or reference set point from main control valve MCV position reference circuitry 135. The main control valve set point may be on automatic or manual control with manual control being implemented through push buttons 137. The automatic signal is generated in the automatic control circuitry 56 and input to the MCV circuit 135 on line 138. The output of summing junction 133 is input into a low value gate 141 on line 142. The output 143 of low value gate 141 provides a main control valve position demand signal in accordance with the lowest one of several signal inputs. In addition to the speedload signal 142 from summing junction 133, the low value gate receives a pre-emergency speed signal 145 from comparator circuit 146 which provides a valve closing signal at predetermined speed in excess of turbine rated speed. An MCV limit signal 147 may be input into MCV-ACV register 148 to provide a valve position limit signal which may be invoked either manually (push buttons 149) or automatically through the set point 147 generated in the automatic control circuitry 56. A comparator circuit 150 and associated display will indicate whenever the output of low value gate 141 is MCV limited; i.e., A is less than or equal to B.

An important feature of the present invention is the manner in which the control system switches from inlet pressure control to inlet pressure control and speed/load control, to predominant pressure control. Inlet pressure control is maintained in a signal range of from 1 to 10 volts in accordance with the output of summing amplifier 105A or 105B. The control is a split range control described as follows. "0" volts means the bypass is closed whereas 10 volts means the bypass is open. Thus, as steam flow and pressure begin to increase it will drive the respective outputs of summing amplifiers 105 higher so that the high pressure bypass valve opens further. Note that the output of low value gate 127 is input into the summing junction 129 along with the MCV speed/load signal 142. As long as the output of amplifiers 105 is positive, there will be no effect on the MCV valve position signal 143 through low value gate 141. Thus the HPBP will control inlet pressure based upon the summer amplifier output 105 and the MCV will be positioned by the output of speed/load summer 133 assuming no lower limit signal is present. However, as the MCV opens, the inlet header pressure falls, causing the outputs of amplifiers 105 to go less positive (negative slope) indicating a desired HPBP valve closing to maintain pressure floor. As the HPBP closes, the driving signal will go to zero and then increase negatively. This means that the actual pressure is still decreasing and that the HPBP valve can no longer hold pressure at floor level. At this point, the MCV speed/load signal 142 is higher than the pressure signal output 152 of the HPBP control summer 129 and so the pressure signal 152 takes over through low value gate 141 to control the main control valve MCV.

Simultaneously, through set point ramp 151, the main control valve bias or setpoint is ramped to a maximum value; i.e., 10 volts, which is then added in to summing junction 129 on line 142 as an offset to provide a positive output to the main control valve actuators. Comparator circuit 153 gives notice with respect to whether pressure control is by high pressure bypass valve or main control valve. An enable signal 154 (dashed line) is forwarded to comparator circuit 153 by in service-out of service logic 119 to assure that manual control is not being used.

The main control valve having assumed pressure control will begin to open further as steam flow increases in response to increased load demands and increased steam availability. Likewise with increased flow there will be an increase in steam pressure. This increase in actual pressure will be transmitted through summing amplifiers 105, low value gate 127, summing junction 129 and low value gate 141 so as to cause the main control valve MCV 155 to open in order to maintain pressure at the floor set point.

The main control valve will tend to go to a full open position in order to control the increasing flow and pressure. At full open or some lesser value which allows a "reserve set" or margin for pressure transients, the valve can no longer handle the pressure and flow at the floor pressure setpoint. According to the present invention, the pressure setpoint is increased in accordance with the increased pressure and flow and so the steam turbine power plant assumes a boiler following mode as described hereafter. An MCV position (feedback) signal 156 from the main control valve is input into summer 157 where it added to an MCV reserve set or desired valve position on reserve set circuit 159. The MCV reserve is set at some convenient value less than 100% full open and usually at about 95% to allow some margin for pressure transients. If the valve position attempts to exceed the reserve setpoint position, a positive error signal 160 will be output from the summing junction 157 into a proportional plus reset circuit 161 with rate limit. The output signal from proportional plus reset circuit 161 is added in summer 162 to the floor setpoint adjustment circuit 166 to produce a new higher pressure setpoint through register 168 into summing amplifier circuits 105. One limit to the raise in pressure setpoint in the introduction of a ceiling setpoint 165 at about 850 psig; the limit being implemented through low value gate 167. Comparator 169 provides an output signal whenever the pressure reference setpoint (A) from summing junction 162 exceeds the ceiling setpoint 165 (B) in order to provide a clamp signal 170 to integrator circuit 161 and thereby prevent integrator windup.

So far, the description of the invention has included inlet pressure control, inlet pressure control and speed-load control, boiler following pressure control by the MCV as pressure and flow increase and now boiler following pressure control as pressure and flow decrease as, for example, during a gas turbine trip or other off-normal condition. A rapid deterioration in header steam pressure sensed by transducers 101 cause a new valve position signal output from summer-amplifiers 105. One of these new valve position signals is passed through low value gate 127 into summing junction 129. Since the HPBP valve is closed and pressure is decreasing, the MCV will be required to close in order to hold pressure. This means that there will be an increasingly negative input into summing junction 129 which will result in a less positive valve closing output 143 from low value gate 141. This is a fast feedforward loop which will rapidly cause the MCV to respond to changes in pressure. As this is happening, the pressure setpoint into summing amplifiers 105 is being readjusted to match the new actual pressure and valve position. Pressure drop through integrator circuitry 161 is rate limited (R) so as to avoid boiler upsets. In one example an appropriate rate limit was determined to be 50 psig/min. At some point, the main control valve will reestablish pressure control and hold pressure at a particular valve position until an increase in pressure and flow calls for more open valve positions.

Figure 4:
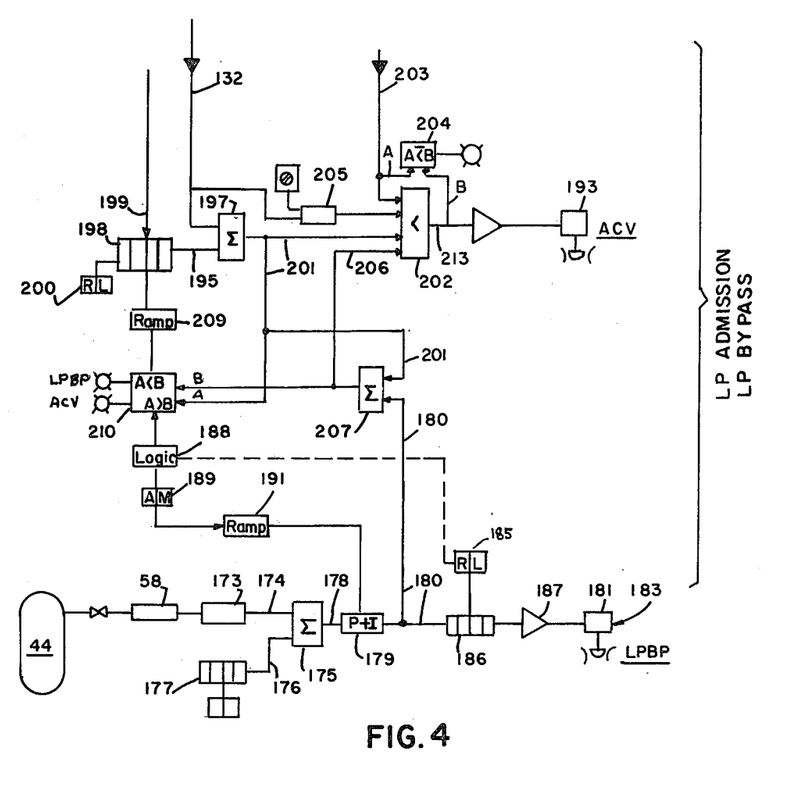
FIG. 4 is a continuation of FIG. 3 such that the two drawings vertically placed together disclose a complete system in accordance with the present invention.

The discussion now turns to the low pressure admission control bypass control and low pressure bypass control which are similar in concept and operation to the HPBP control and MCV control. Referring to FIG. 4, flash tank 44 is a steam source whose steam pressure is sensed by pressure transducer 58. The output of the pressure transducer is scaled and conditioned by buffer circuit 173 to provide an input signal 174 proportional to pressure into summing junction 175. A reference pressure input 176 is provided into the same summing junction from input register 177. Output 178 from the summing junction representing the difference between actual and reference pressure is input into proportional plus integral circuit 179 to provide a pressure error signal 180 having split range characteristic. A positive signal will cause the low pressure bypass valve 183 to assume a proportionate open position as, for example, zero volts closed, positive 10 volts wide open. A negative signal means that the low pressure bypass valve is closed and that the admission control valve is somewhere between full open zero volts and full closed negative 10 volts. Manual LPBP raise-lower push buttons 185 provide direct positioning of the LPBP valve through register 186, amplifier 187 and servo operator 181. Logic circuit 188 disables the push buttons 185 if automatic control is desired as selected by the operator through Automatic or Manual push buttons 189. If the low pressure control is in service, logic circuit 188 disables the operation of push buttons 185 and sends a permissive signal to comparator 210. The low pressure bypass admission control is disabled by means of a ramp 191 to integrator 179.

The admission control valve ACV 193 admits steam into the low pressure turbine stages. The turbine is started in sequence with the opening of the main control valve, closing of the high pressure bypass valve and opening of the admission control valve. Register 198 will put out a reference position signal 195 through either a setpoint 199 generated in the autocontrol circuitry 56 or a manual input set by push buttons 200. The reference signal 195 is input into summer 197 along with speed signal 132 in order to provide automatic closure of the ACV 193 should a subsequent overspeed condition occur. The output 201 of summing junction 197 is a speed sensitive valve position signal for the ACV which is a first input into low value gate 202. Limit signal 203 from register 148 will limit valve opening if such is programmed or manually input into register 148. If the ACV limit were reached; i.e., the input limit 203(A) is equal to the output signal 213(B) of low value gate 202, then this fact would be recognized by comparator 204. Likewise pre-emergency circuit 205 will limit valve opening whenever the turbine speed tends to exceed a predetermined limit above rated speed and below overspeed.

Another input into low value gate 202 is the pressure sensitive signal 206 from the low pressure bypass control circuitry. This signal will be effective in the ACV circuit through low value gate 202 whenever the LPBP valve is closed and the ACV circuit is on pressure control. Pressure sensitive signal 206 is the summation of pressure error signal 180 and valve position signal 201 at summer 207. If pressure error signal 180 goes negative it will control the ACV 193 through low value gate 202 since signal 206 will be less than signal 201 or as expressed in comparator 210 A>B. This lights up ACV indicator proximate to the comparator to indicate ACV pressure control status. Ramp 209 resets register 198 to maximum so that valve position is now controlled by available pressure and steam flow.

The operation of the steam turbine power plant in accordance with the present invention steam turbine control may be described as follows referring to the drawings. In a combined cycle power plant, waste heat from gas turbines is utilized to produce steam in order to drive a steam turbine. This energy transformation heat to steam takes place in a heat recovery steam generator HRSG. Each gas turbine has its own HRSG whereas the steam outputs of the HRSG are combined into a single high pressure steam inlet header. Concurrently, low pressure steam is available from a so-called DASSH cycle flashtank. Steam pressure is gradually built up in the steam header by sequentially putting the HRSG's on line. Prior to going on line, the gas turbine exhaust may be partially diverted by dampers which control the heat applied to the steam generating tubes in the HRSG. The high pressure bypass valve HPBP opens whenever the sensed steam pressure exceeds a floor setpoint in order to control steam pressure at the floor level. Likewise, the low pressure bypass valve LPBP opens whenever flash tank pressure exceeds a preset limit. When sufficient roll flow is established, the auto control circuitry will cause speed setpoints to be input into the speed/load control in accordance with programmed instructions which take into account temperature restraints as the turbine warms up. As speed is established, more flow is diverted through the main control valves MCV causing the HPBP valve to assume more closed positions in order to maintain pressure at the floor level. At 3600 rpm's the turbine and generator are synchronized and load control is established. As load setpoints are met, further steam is diverted through the main control valves until the HPBP valve can no longer maintain pressure control and closes. At this point, the MCV assumes pressure control and load will be added as pressure becomes available. The load control in the speed-load circuitry is ramped to maximum. The plant control assigns a load demand to the steam turbine which is forwarded to the HRSG control to cause damper controls to increase exhaust gas flow through the HRSG thereby increasing HRSG steam output. The increased steam output will cause a pressure increase resulting in a larger valve opening to maintain floor pressure. At the valve reserve set position, the valve will remain fixed and the pressure setpoint will be reset automatically. In the low pressure admission control, the admission control valve ACV will open in a programmed manner after the HPBP has been closed and will gradually cause the low pressure bypass valve to close and thus put the ACV on pressure control.

While there has been shown what is considered to be the preferred embodiment of the invention, it is recognized that other modifications may be made therein, and it is intended to cover all such modifications as fall within the true spirit and scope of the invention.

What is claimed is:

1. In a power plant including a steam turbine connected to a steam source through a steam header and having a main control valve for admitting steam to the steam turbine and a bypass valve for diverting steam around the steam turbine, a method for controlling the steam turbine comprising the steps of:
   measuring steam header pressure;
   opening the bypass valve at a pressure setpoint floor;
   opening the main control valve for speed/load control;
   closing the bypass valve to maintain the steam header pressure at the pressure setpoint as the main control valve opens;
   transferring from speed/load control to pressure control;
   opening the main control valve further to hold the steam header pressure at setpoint as steam flow increases;
   comparing the main control valve position to a reserve set valve position setpoint; and,
   adjusting the pressure setpoint to maintain the main control valve position at the reserve set valve position setpoint in the valve open direction.

2. The method recited in claim 1 further comprising the steps of:
   closing the main control valve in response to a pressure/flow decrease in the steam header in order to maintain the pressure setpoint; and,
   decreasing the pressure setpoint at a maximum predetermined rate to reopen the valve.

3. The method recited in claim 1 wherein the transfer from speed/load to pressure control in the main control valve comprises the additional setps of:
   gating a pressure signal and a speed/load signal wherein the speed/load signal dominates the main control valve as long as the bypass valve remains open;
   ramping the speed/load signal to a maximum valve after the bypass is closed; and,
   positioning the main control valve in accordance with the pressure signal after the bypass valve is closed.

4. In a power plant including a steam turbine connected to a steam source through a high pressure steam header including a main control valve for admitting steam to the steam turbine and a high pressure bypass valve for diverting steam around the steam turbine, the power plant further including a low pressure steam header including an admission control valve for admitting steam to the steam turbine and a low pressure bypass valve for diverting steam around the steam turbine, a method for controlling the steam turbine comprising the steps of:
   measuring steam pressure in the high pressure steam header;
   opening the high pressure bypass valve at a preset floor pressure so as to maintain floor pressure in the high pressure steam header;
   opening the main control valve for speed/load control;
   closing the bypass valve to maintain steam header pressure in the high pressure header at the preset floor pressure as steam flow increases;
   comparing the main control valve position to a reserve set valve position setpoint;
   adjusting the pressure setpoint to maintain the main control valve position at the reserve set valve position setpoint;
   opening the low pressure bypass valve at a predetermined pressure setpoint;
   opening the admission control valve in response to a load demand setpoint; and,
   closing the low pressure bypass valve as the admission control valve opens whereby low pressure header control is transferred to the admission control valve after the low pressure bypass valve is closed.

5. The method recited in claim 4 further comprising the steps of:
   gating a pressure sensitive signal and a speed/load signal wherein the speed/load signal dominates the main control valve as long as the high pressure bypass valve remains open;
   ramping the speed load signal to a maximum value after the high pressure bypass valve is closed; and,
   positioning the main control valve in accordance with the pressure sensitive signal after the high pressure bypass valve is closed.

6. The method recited in claim 5 further comprising the steps of:
   gating a pressure sensitive signal and a speed/load signal wherein the speed/load signal dominates the admission control valve as long as the low pressure bypass valve remains open;
   ramping the speed/load signal to a maximum value after the low pressure bypass valve is closed; and, positioning the admission control valve in accordance with the pressure sensitive signal after the low pressure bypass valve is closed.

7. In a steam turbine power plant comprising a steam source connected to a steam turbine through a steam header including a main control valve for admitting steam to the steam turbine and a bypass valve for diverting steam around the steam turbine, means for controlling the operation of the steam turbine comprising:
 a bypass control for positioning said bypass valve in accordance with a floor pressure setpoint;
 a speed/load control for positioning said main control valve in accordance with a speed/load setpoint; and,
 a main control valve circuit receiving inputs from said bypass control and said speed/load control, said main control valve circuit including a low value gate passing either the speed/load output or a pressure dependent signal.

8. The steam turbine control recited in claim 7 wherein the main control valve circuit further comprises:
 a summing junction having inputs from the speed/load control and the bypass control; the low value gate receiving as inputs the output of the speed/load control and the summing junction output; and,
 a ramp circuit connected to the speed/load control for providing a valves wide open signal to the speed/load control whenever the bypass valve is completely closed.

9. The steam turbine control recited in claim 7 wherein the main control valve circuit further comprises:
 a summing junction having inputs from the speed/load control and the bypass control; the low value gate receiving as inputs the output of the speed/load control and the summing junction output whereby as the bypass control input goes negative the speed/load input to the low value gate is gated out.

10. The steam turbine control recited in claim 9 further comprising:
 a comparator circuit connected to the speed/load control and the output of the low value gate providing a signal whenever the summing junction output is less than the speed/load signal.

11. The steam turbine control recited in claim 10 further comprising:
 a ramp circuit having an input connected to the comparator circuit and an output connected to the speed/load control whereby the speed/load signal is ramped to maximum in response to an output signal from the comparator circuit.

12. In a steam turbine power plant comprising a steam source connected to a steam turbine through a steam header including a main control valve for admitting steam to the steam turbine and a bypass valve for diverting steam around the steam turbine, means for controlling the operation of the steam turbine comprising:
 a bypass control for positioning said bypass valve in accordance with a floor pressure setpoint;
 a speed/load control for positioning said main control valve in accordance with a speed/load demand; and,
 a main control valve circuit receiving inputs from said bypass control and said speed/load control including a summing junction receiving inputs from said bypass control and said speed/load control and a low value gate receiving inputs from said speed/load control and said summing junction whereby if the output of the summing junction is less than the speed/load signal, pressure control will prevail.

13. A steam turbine control for a steam turbine having a main control valve and a bypass control valve said steam turbine control including a split pressure control comprising:
 an inlet steam pressure transducer;
 means for comparing inlet pressure with a pressure setpoint;
 a bypass valve positioning circuit for operating said bypass valve whenever the output of said pressure comparator is positive; and,
 a main control valve positioning circuit for operating said main control valve whenever the output of said pressure comparator is negative.

14. The steam turbine control recited in claim 13 further comprising:
 ramp means for offsetting a negative signal from said pressure comparator whereby both the bypass valve position circuit and the main control valve positioning circuit operate on a positive signal input.

15. In a steam turbine power plant comprising a steam source connected to a steam turbine through a steam header including a main control valve for admitting steam to the steam turbine and a bypass valve for diverting steam around the steam turbine, means for controlling the operation of the steam turbine comprising:
 a bypass control for positioning said bypass valve in accordance with a floor pressure setpoint;
 a speed/load control for positioning said main control valve in accordance with a speed/load demand setpoint;
 a main control valve circuit for comparing the bypass control signal with the speed/load control signal whereby if the bypass valve is closed the bypass signal supersedes the speed/load signal; and,
 a main control valve position feedback signal to said bypass control whereby the floor pressure setpoint is superseded by a variable pressure setpoint after the main control valve has reached a reserve position setpoint.

16. The turbine control recited in claim 15 wherein the main control valve position feedback signal includes:
 means for determining the main control valve position;
 summing means comparing the main control valve position with a reserve position setpoint;
 integrator means providing an output signal whenever the actual valve position tends to exceed the reserve position setpoint; and,
 means for raising the pressure setpoint in accordance with the integrator output.

17. In a steam turbine power plant comprising a steam source connected to a steam turbine through a steam header including a main control valve for admitting steam to the steam turbine and a bypass valve for diverting steam around the steam turbine, means for controlling the operation of a steam turbine comprising:
 a bypass control positioning the bypass valve in accordance with a floor pressure setpoint;
 speed/load control positioning the main control valve in accordance with a speed/load setpoint;

a main control valve circuit comparing an output signal from the bypass control and an output signal from the speed/load control; the main control valve circuit including means for selecting either output signal as the main control signal; and, a main control valve position feedback circuit for increasing said pressure setpoint in the bypass control whenever the main control valve exceeds the reserve position setpoint.

18. In a power plant including a steam turbine connected to a steam source through a high pressure steam header including a main control valve for admitting steam into the steam turbine and a high pressure bypass valve for diverting steam around the steam turbine, the power plant further including a low pressure steam header including an admission control valve for admitting steam to the steam turbine and a low pressure bypass valve for diverting steam around the steam turbine, means for controlling the steam turbine comprising:

a high pressure bypass control for positioning said high pressure bypass valve in accordance with a floor pressure setpoint;

a speed/load control for positioning said main control valve in accordance with a speed/load setpoint;

a main control valve circuit positioning said main control valve according to either the high pressure bypass control signal or the speed/load control signal;

a low pressure bypass control for positioning said low pressure bypass valve in accordance with a low pressure setpoint; and, an admission control valve circuit for positioning the admission control valve in accordance with a signal from said speed/load control.

19. The control system recited in claim 18 further comprising:

a valve position feedback circuit from said main control circuit to said high pressure bypass control; and, means for increasing the pressure setpoint in accordance with the deviation of a main control valve position demand from a preset reserve signal.

20. The control system recited in claim 19 further comprising:

a first signal ramp means connecting the main control valve circuit with the speed/load circuit;

a second signal ramp means connecting the admission control valve circuit with the speed/load circuit; and, comparator circuits connected respectively to each of said ramps whereby the respective speed/load signals are ramped to a maximum valve whenever each respective high pressure or low pressure bypass valve is closed.

* * * * *